United States Patent
Weber

(10) Patent No.: US 6,717,742 B2
(45) Date of Patent: Apr. 6, 2004

(54) OBJECTIVE FOR A MOVIE CAMERA

(75) Inventor: Uwe Weber, Aalen (DE)

(73) Assignee: Carl-Zeiss-Stiftung, Heidenheim (DE)

( * ) Notice: Subject to any disclaimer, the term of this patent is extended or adjusted under 35 U.S.C. 154(b) by 0 days.

(21) Appl. No.: 10/404,313

(22) Filed: Mar. 31, 2003

(65) Prior Publication Data

US 2003/0189691 A1 Oct. 9, 2003

(30) Foreign Application Priority Data

Apr. 5, 2002 (DE) .......................................... 102 15 140

(51) Int. Cl.[7] .............................. G02B 15/14; G02B 7/02
(52) U.S. Cl. ........................ 359/694; 359/823; 359/696
(58) Field of Search ................................. 359/694, 696, 359/822, 823, 828, 738, 739, 740

(56) References Cited

U.S. PATENT DOCUMENTS 3,854,811 A * 12/1974 Araki .......................... 396/358
5,969,886 A * 10/1999 Sato et al. ................... 359/813
6,421,192 B2 * 7/2002 Nomura et al. .............. 359/828

* cited by examiner

*Primary Examiner*—Ricky Mack
(74) *Attorney, Agent, or Firm*—Wells St. John P.S.

(57) ABSTRACT

An objective for a movie camera for digital cinematography comprises a cylindrical main barrel with a bayonet or K mount, an inner tube, fixed optical elements, adjustable optical sliding elements and drive rings with scales for adjusting the optical sliding elements that are mounted rotatably in the axial direction on the main barrel. The objective also comprises an iris diaphragm with a diaphragm ring rotating on the main barrel, an internal focusing system and a back focus correction device. The inner tube is mounted on the main barrel in a fashion displaceable along the optical axis for the purpose of back focus correction by means of the back focus correction device. The fixed optical elements, the iris diaphragm and sliding holders for holding the adjustable optical sliding elements are inserted into the inner tube.

15 Claims, 1 Drawing Sheet

OBJECTIVE FOR A MOVIE CAMERA

BACKGROUND OF THE INVENTION

CROSS REFERENCE TO RELATED APPLICATION

This application relates to and claims priority to corresponding German Patent Application No. 102 15 140.7, which was filed on Apr. 5, 2002.

1. Field of the Invention

The invention relates to an objective for a movie camera for digital cinematography in accordance with the preamble of claim 1, and to a set of objectives in accordance with the preamble of claim 15.

2. Description of the Related Art

Apart from a rotating mirror that splits up the light in the viewfinder direction and the film direction, in conventional movie cameras only air is located between the bearing surface of the objective and the image plane, that is to say the film. The mirror is, as it were, the only mechanism that is always located between objective and film. This distance can therefore be kept very accurately and can likewise be produced exactly. Moreover, this distance is largely constant even at different temperatures, and so additional adjustment is not required here. The objective is therefore responsible only for the usual tasks, specifically the imaging optical system, the regulation of the diaphragm, the focusing and, if appropriate, a zoom mechanism. An additional mechanism is not required to compensate possible camera tolerances.

The situation is different from this in the case of digital movie cameras. Here, a plurality of optical elements affected by tolerance are located between the bearing surface of the objective and the image plane, which is represented by three CCDs. For example, complicated prismatic devices split up the images into the RGB color channels. Again, additional specific properties are further achieved with the aid of a complicated upstream filter system. A suitable compensation is required owing to this additional quantity of tolerance-affected optical elements, this also being due to the summation of the respective individual tolerances. It should therefore be possible to correct the mount-to-film distance. Movie cameras do not offer this possibility of correction, and this must therefore be integrated into the objectives. Moreover, it is further to be remarked that this correction must also be possible during normal operation, since, firstly, the tolerances can change permanently owing to the development of heat or similar and, secondly, for example, there is generally no use of zoom objectives in digital cinematography, that is to say depending on setting on a camera use is made of a plurality of objectives with different focal lengths in each case.

The necessity of correcting the mount-to-film distance, the so-called back focus correction, is sufficiently known. In the video field (for example newscasts or similar), it is customary to use zoom objectives and in this case the rear element thereof can be displaced for the purpose of back focus correction. It is very disadvantageous that in this operation there is a substantial change in the distance setting. The indication (normally the rings for distance setting/focusing of the objective) no longer corresponds exactly to the distance set, and this entails unsharpness of the image. However, viewfinders are used in the video field, and so the camera operators see when the image becomes unsharp and then immediately correct the distance setting. Here, the camera operators work less with the distance scale of the objective. It is disadvantageous, in addition, that each objective requires a different back focus traveling stroke, although the error in the mount-to-film distance is always the same.

Whereas in the case of the video technology described above, for example in order to record news or television reports, the setting and/or the accuracy of the distance scale plays a rather subordinate role, because any instances of unsharpness that occur can be detected by the camera operator in the viewfinder and corrected, this state of affairs is entirely different in cinematography, the production of movies or advertising films. Here, it is already fixed before shooting at which time actors or props are situated at which location. It is normal in cinematography for movie cameras to be operated by two camera operators, of whom one is responsible for viewing and the other, the so-called camera assistant, is responsible for image sharpness. The latter observes the scenes to be filmed and readjusts the distance without a camera viewfinder merely with the aid of the distance scale on the basis of his own estimate. This is necessary chiefly when actors may move faster or differently than was previously laid down. Since the camera assistant works only with the aid of the distance scale, the latter must be exactly correct because, by contrast with normal TV technology, in cinematography instances of unsharpness have substantial effects (size of the cinema screen, etc.).

Since the camera assistant regulates the sharpness only with the aid of the rotary distance ring with reference to the scale engraved on the objective, the latter must be very accurate. This was not much of a problem with conventional movie cameras (non-digital) since, as already mentioned above, there was no need for back focus correction. However, with digital cinematography there is a need to correct the back focus because of the tolerances of the digital movie camera. This correction of the back focus entails altering the distance scale to the effect that so-called scale spreading occurs. In the case of scale spreading, the distances of the scale marks on the rotary distance ring would actually have to change relative to one another, but said ring is a solid element that is unalterably engraved. Consequently, when correcting the back focus it is no longer possible to read off the scale accurately, as is required in cinematography.

In conjunction with fixed focal lengths, for the purpose of adjusting the back focus previous objectives for digital cinematography have an adjustable index mark for the distance scale of the rotary distance ring. By subsequently rotating this so-called index ring, the indicated value of the distance scale can be corrected for exactly one distance. Otherwise than in the case of conventional objectives, in which a rotatable scale and a fixed part with the index mark are always rotated. The sequence when shooting a movie then shapes up approximately as follows: for cameras and objectives there are so-called rental stocks that have a large number of different cameras and associated objectives. The movie people assemble their equipment for the respective set. This also includes, for example, lighting, stands, etc. Before filming is started, the optical system, that is to say camera and objective, is firstly checked and, if appropriate, corrected. This task is usually carried out by the camera assistant. The latter mounts the camera on a stand and sets up a so-called test image, with structures that can be focused with appropriate sharpness, at a specific prescribed distance (for example 3 meters). The prescribed distance is then set with the aid of the distance setting at the objective. This is followed by using the back focus correction for focusing with reference to the test image, something which can be accomplished with the aid of an HD monitor, for example.

Filming is started thereafter. This process naturally has to be repeated if appropriate when changing the camera or the objective (for example for other instances of viewing).

It is very disadvantageous in this case that when a different distance is being set the indicated scale value of the objective is no longer exactly correct, since the objectives have a so-called internal focusing in which only a portion of the optics in the system is moved and this is not in a linear relationship with the adjustment of the overall objective or with the correction to the back focus.

SUMMARY OF THE INVENTION

It is therefore the object of the present invention to provide an objective for a movie camera for digital cinematography of the type mentioned at the beginning, and a set of objectives by means of which the disadvantages of the prior art are eliminated, the aim being, in particular, for the scale values to be correct in every situation, a correction of the back focus having no influence on the calibration of the distance scale, and it is also intended that the external controls of the objective do not take part in any axial movement during back focus correction, and that all objectives are based on the same mechanism in the sense of a modular system.

This object is achieved according to the invention by virtue of the fact that the inner tube is mounted on the main barrel in a fashion displaceable along the optical axis for the purpose of back focus correction by means of the back focus correction device, the fixed optical elements, the iris diaphragm and sliding holders for holding the adjustable optical sliding elements being inserted into the inner tube.

The object is achieved with reference to the set of objectives wherein the arrangement of said optical elements in the sequence of fixed front element, sliding holders with associated adjustable optical sliding elements, fixed intermediate element, iris diaphragm and fixed rear element is constant, the focusing mounts of the respective objectives differing from one another only in the external lettering or engraving and in the pitches of the respective motion-transmitting threads of the internal focusing devices, and/or in the focal lengths of the objectives.

The measures named above result in a nested arrangement of functional elements which permits the movements required for back focus correction to be done in the objective without the need for the drive rings also to move axially on the outside, in particular electric drives, suppressors, compendiums etc., and without changing the accuracy with which the scales, in particular the distance scale, are read off. Since the back focus drive is always the same in a simple and advantageous way and the arrangement of the optical elements (fixed front element, moveable sliding elements, fixed intermediate element, iris diaphragm, fixed rear element) has also been kept constant for all objectives in the set, the focusing mounts differ only in the external lettering (engraving) and in the pitch of the motion-transmitting thread of the internal focusing system (different traveling strokes have to be produced here in conjunction with the same angle of rotation). As a result, there is, firstly, a reduction in the number of different parts of the objective, and secondly an increase in the number of items of same parts, and so the production of the focusing mount exhibits large economic advantages.

It is also advantageous when the back focus ring can be locked by the clamping element after the back focus correction, and the clamping element is designed as a clamping screw.

It can be ensured through these measures that the back focus correction mechanism is secured against accidental or undesired adjustment.

In an advantageous development of the invention, it can also be provided that the objective has a zoom setting system, at least one of the adjustable optical sliding elements being designed as a lens group for zoom setting, and at least one of the drive rings being designed as a zoom ring.

Zoom objectives can also be produced in a simple way by means of these measures. Provided to that end is a further sliding holder for holding a lens group for the zoom setting system. The optical sliding element for the zoom setting system is adjusted by an associated drive ring designed as a zoom ring.

Advantageous refinements and developments of the invention emerge from the further subclaims and from the exemplary embodiment described below in principle with the aid of the drawing, in which:

DETAILED DESCRIPTION

Figure 1:
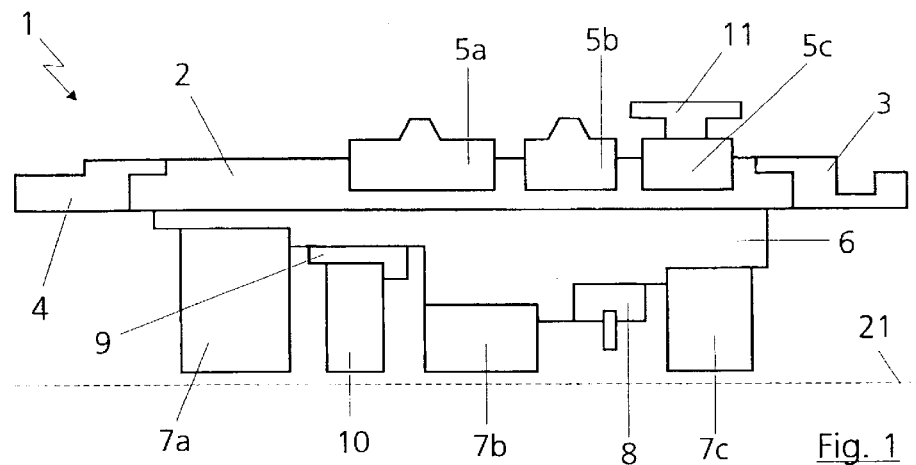
FIG. 1 shows a schematic of the principle of the design of an objective according to the invention.

As may be seen from FIG. 1, an objective 1 for a movie camera that is suitable for digital cinematography has a cylindrical main barrel 2 with a bayonet or K mount 3 for mounting the objective 1 onto a movie camera (not illustrated), and a compendium ring 4 for connecting a compendium objective (not illustrated). Rotating outside on the main barrel 2 are drive rings 5, specifically a rotary distance ring 5a, a diaphragm ring 5b and a back focus ring 5c. These drive rings 5 partly have scales (not illustrated) for accurate setting by the user. The core of the objective 1 is the main barrel 2, in which an inner tube 6 is mounted such that it can be displaced in the direction of an optical axis 21 indicated by dashes in FIGS. 1 and 2. Fixed optical elements 7, specifically a front element 7a, an intermediate element 7b and a rear element 7c, as well as an iris diaphragm 8 are fastened on the inner tube 6. Moreover, a sliding holder 9 that for its part supports the adjustable optical sliding element 10 for internal focusing is displaceably mounted in the inner tube 6. The adjustable optical sliding element is designed as a lens group 10.

If the rotary distance ring 5a is now turned, a traveling stroke displaces only the sliding holder 9 with the adjustable optical sliding element 10, all other elements remaining stationary. If the diaphragm ring 5b is rotated, the iris diaphragm 8 opens or closes. If the back focus ring 5c is rotated, the complete inner tube 6 with all elements contained is displaced for the purpose of back focus correction. The accuracy of the distance setting is retained by the overall displacement of the optical system when the back focus ring 5c is actuated.

In another exemplary embodiment, the objective 1 could additionally include a zoom setting system. It would be possible for this purpose to mount on the main barrel a zoom ring that resembles the rotary distance ring 5a and uses a further adjustable optical zoom element to adjust a further sliding holder arranged between the adjustable optical sliding element 10 and the front element 7a.

As may further be seen from FIG. 1, the back focus ring can be locked by a clamping element that is designed as a clamping screw 11, in order to avoid undesired rotation after the setting of the back focus.

Figure 2:
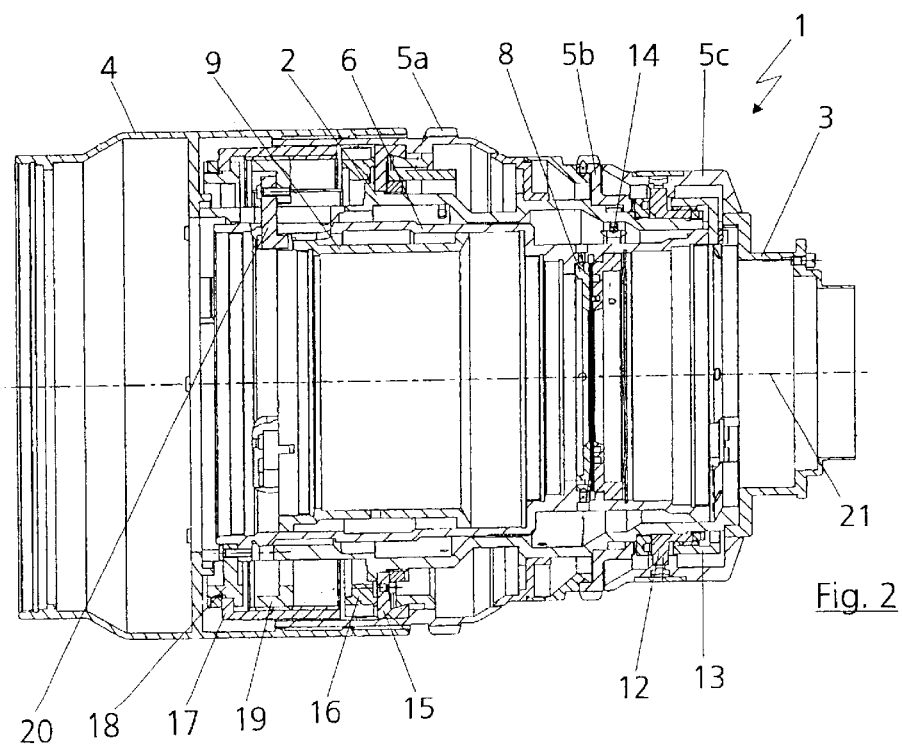
FIG. 2 shows a longitudinal section through an objective according to the invention.

As may be seen from FIG. 2, the back focus ring 5c is mounted on a back focus input drive part 12 that rotates on the main barrel 2 and produces a traveling stroke in the back focus output drive part 13 by means of a motion-transmitting thread (not illustrated in more detail). This traveling stroke is transmitted onto the inner tube 6 through the main barrel 2 via a through-passage (not illustrated). Consequently, when the back focus ring 5c is rotated a movement of the inner tube 6 relative to the fixed main barrel 2 is produced. In other words, the main barrel 2 with the drive rings 5 mounted thereupon remains in its position during the back focus correction.

The diaphragm ring 5b rotates on the main barrel 2. The rotary movement of the diaphragm ring 5b is transmitted onto the iris diaphragm 8 via a driver 14 comprising groove and pin. Nothing changes at the iris diaphragm 8 during a movement for back focus correction. The rotary distance ring 5a is mounted on a bearing ring 15 that rotates on the main barrel 2 and transmits the rotary movement onto a distance input drive 17 via an Oldham coupling 16. The Oldham coupling 16 in this case permits the back focus traveling stroke and transverse offsets between the bearing ring 15 and the distance input drive 17. The distance input drive 17 rotates on a bearing ring 18 that is connected to the inner tube 6, and produces a traveling stroke of the distance output drive 19 by means of a motion-transmitting thread (not illustrated in more detail). This traveling stroke is transmitted onto the sliding holder 9 by means of a web 20 via a through-passage through the main barrel 2 and the inner tube 3. Thus, when the rotary distance ring 5a rotates a movement of the sliding holder 9 relative to the inner tube 6 is produced that is independent of the back focus.

There is in each case between the sliding holder 9 and the inner tube 6 and between the inner tube 6 and the main barrel 2 a rotation-prevention means (not illustrated) that permits traveling strokes of the elements relative to one another, but no rotary movements.

Owing to the nested arrangement of functional elements in the present exemplary embodiment, it becomes possible to produce the required movements in the objective 1 without the need for the drive rings 5 also to move axially on the outside, and without changing the accuracy with which the scales are read off. Since the back focus drive is always the same, and the arrangement of the optical elements (fixed front element 7a, moveable sliding element 10, intermediate element 7b, iris diaphragm 8 and fixed rear element 7c) is also kept constant for all objectives 1 in a set, the focusing mounts differ from one another only in the external lettering (engraving) and the pitch of the motion-transmitting thread of the internal focusing system (different traveling strokes must be produced here for the same angle of rotation). Owing to these measures, on the one hand there is advantageously a reduction in the number of different parts, and on the other hand an increase in the number of items of the same parts, as a result of which the focusing mount has great economical advantages.

Objectives 1 in the set have between 14 and 19 lenses.

What is claimed is:

1. An objective for a movie camera for digital cinematography, comprising:
    a cylindrical main barrel with a bayonet or K mount,
    an inner tube,
    fixed optical elements,
    adjustable optical sliding elements,
    drive rings with scales for adjusting the optical sliding elements, which are mounted rotatably in the axial direction on the main barrel,
    an iris diaphragm with a diaphragm ring rotating on the main barrel,
    an internal focusing system, and
    a back focus correction device,
    wherein said inner tube is mounted on said main barrel in a fashion displaceable along the optical axis for the purpose of back focus correction by means of said back focus correction device, said fixed optical elements, said iris diaphragm and sliding holders for holding said adjustable optical sliding elements being inserted into said inner tube.

2. The objective as claimed in claim 1, wherein said back focus correction device has a back focus ring mounted on said main barrel, a back focus input drive part, a back focus output drive part, and a clamping element.

3. The objective as claimed in claim 2, wherein said displacement of said inner tube is performed by axial rotation of said back focus ring rotatably mounted on said main barrel, without varying the setting or the calibration or the accuracy of said adjustable optical sliding elements or of their drive rings, in particular of said internal focusing system, without varying the diaphragm setting and without changing the position of said main barrel with said drive rings mounted thereupon.

4. The objective as claimed in claim 2, wherein said back focus ring is mounted on said back focus input drive part.

5. The objective as claimed in claim 2, wherein said back focus input drive part is mounted rotatably on said main barrel, and a motion-transmitting thread is provided for producing traveling stroke in the back focus output drive part, a through-passage being provided for transmitting the traveling stroke through said main barrel onto said inner tube.

6. The objective as claimed in claim 2, wherein after back focus correction said back focus ring can be locked by said clamping element.

7. The objective as claimed in claim 2, wherein said clamping element is designed as a clamping screw.

8. The objective as claimed in claim 1, wherein a driver is provided for transmitting onto said iris diaphragm the rotary movement of said diaphragm ring mounted rotatably on said main barrel.

9. The objective as claimed in claim 1, wherein at least one of said adjustable optical sliding elements is designed as a lens group for internal focusing, at least one of said drive rings being designed as rotary distance ring in order to set said focusing.

10. The objective as claimed in claim 9, wherein said rotary distance ring is mounted on a bearing ring that rotates on said main barrel and an Oldham coupling is provided for transmitting this rotary movement onto a distance input drive, said Oldham coupling permitting the back focus traveling stroke and transverse offsets between said bearing ring and said distance input drive, said distance input drive likewise being mounted on a bearing ring, the latter being connected to said inner tube and a motion-transmitting thread being provided for producing a traveling stroke onto a distance output drive, a web being provided for transmitting the traveling stroke onto the sliding holder, in which the lens group for internal focusing is mounted, via a through-passage through said main barrel and said inner tube, and a movement of said sliding holder relative to said inner tube being performed, independently of the back focus setting.

11. The objective as claimed in claim 1, wherein a rotation-prevention means that permits traveling strokes of the elements relative to one another without rotary movements is arranged in each case between said sliding holders and said inner tube and between said inner tube and said main barrel.

12. The objective as claimed in claim 1, defined by a zoom setting system, at least one of said adjustable optical sliding elements being designed as a lens group for zoom setting, and at least one of said drive rings being designed as a zoom ring.

13. The objective as claimed in claim 1, wherein said fixed optical elements are designed as a front element, an intermediate element and a rear element.

14. The objective as claimed in claim 1, wherein said fixed optical elements are designed as lens groups.

15. A set of objectives as claimed in one of claims 1 to 15, wherein the arrangement of said optical elements in the sequence of fixed front element, sliding holders with associated adjustable optical sliding elements, fixed intermediate element, iris diaphragm and fixed rear element is constant, the focusing mounts of the respective objectives differing from one another only in the external lettering or engraving and in the pitches of the respective motion-transmitting threads of the internal focusing devices, and/or in the focal lengths of the objectives.

* * * * *

UNITED STATES PATENT AND TRADEMARK OFFICE
CERTIFICATE OF CORRECTION

PATENT NO. : 6,717,742 B2
DATED : April 6, 2004
INVENTOR(S) : Uwe Weber

It is certified that error appears in the above-identified patent and that said Letters Patent is hereby corrected as shown below:

Column 8,
Line 3, replace "A set objectives as claimed in one of claims 1 to 15," should read
-- A set objectives as claimed in one of claims 1 to 14, --.

Signed and Sealed this

Fifteenth Day of March, 2005

JON W. DUDAS
*Director of the United States Patent and Trademark Office*